US012628246B2

(12) United States Patent
Shin

(10) Patent No.: US 12,628,246 B2
(45) Date of Patent: May 12, 2026

(54) PLANAR HEATING ELEMENT, AND CLOTHING MANAGEMENT APPARATUS, HOT/COLD WATER PURIFIER AND FLOOR HEATING PANEL FOR BUILDING, COMPRISING THE SAME

(71) Applicant: S PLUS COMTECH CO., LTD., Seoul (KR)

(72) Inventor: Dong Soo Shin, Gwangmyeong-si (KR)

(73) Assignee: S PLUS COMTECH CO., LTD., Seoul (KR)

( * ) Notice: Subject to any disclaimer, the term of this patent is extended or adjusted under 35 U.S.C. 154(b) by 384 days.

(21) Appl. No.: 18/269,292

(22) PCT Filed: Jan. 25, 2022

(86) PCT No.: PCT/KR2022/001270
§ 371 (c)(1),
(2) Date: Jun. 23, 2023

(87) PCT Pub. No.: WO2022/169169
PCT Pub. Date: Aug. 11, 2022

(65) Prior Publication Data

US 2024/0064870 A1 Feb. 22, 2024

(30) Foreign Application Priority Data

Feb. 3, 2021 (KR) ........................ 10-2021-0015684
Feb. 15, 2021 (KR) ........................ 10-2021-0020005
Sep. 7, 2021 (KR) ........................ 10-2021-0118801

(51) Int. Cl.
*H05B 3/44* (2006.01)
*H05B 3/18* (2006.01)

(52) U.S. Cl.
CPC ................. *H05B 3/44* (2013.01); *H05B 3/18* (2013.01)

(58) Field of Classification Search
CPC .................................... H05B 3/44; H05B 3/18
See application file for complete search history.

(56) References Cited

U.S. PATENT DOCUMENTS 4,304,987 A * 12/1981 van Konynenburg . H01C 7/027 219/505
4,543,474 A * 9/1985 Horsma ................. H01C 7/027 264/105

(Continued)

FOREIGN PATENT DOCUMENTS

EP 1467598 * 10/2004 ............. H05B 3/145
JP 61-161686 A 7/1986

(Continued)

OTHER PUBLICATIONS

EP-1467598 translation (Year: 2004).*

(Continued)

*Primary Examiner* — Kyung S Lee
(74) *Attorney, Agent, or Firm* — Revolution IP, PLLC

(57) ABSTRACT

A planar heating element according to the present invention is configured such that a pair of wires are inserted into a matrix formed by forming a base resin and a conductive material, so that heat is generated by means of electrical resistance that is generated inside the matrix when power is applied, wherein the planar heating element has a simple structure and is easy to manufacture and can achieve a sufficient heating effect regardless of thermal conductivity. In addition, the planar heating element is divided into a heating part and a non-heating part, and the heating part and the non-heating part are integrally manufactured through a double injection molding method. Thus, the present invention has advantages in that various shapes of planar heating elements can be manufactured and that manufacturing costs (Continued)

and manufacturing time can be reduced due to the manufacturing process being simple.

13 Claims, 9 Drawing Sheets

(56) References Cited

U.S. PATENT DOCUMENTS

| | | | | | |
|---|---|---|---|---|---|
| 5,180,900 | A * | 1/1993 | Lovell | H05B 3/12 | 337/415 |
| 2006/0027555 | A1 * | 2/2006 | Aisenbrey | A47J 37/0676 | 219/385 |
| 2010/0221517 | A1 * | 9/2010 | Swift | H01C 7/049 | 428/447 |
| 2013/0207294 | A1 * | 8/2013 | Jeon | C09D 133/14 | 427/508 |

FOREIGN PATENT DOCUMENTS

| | | | | | |
|---|---|---|---|---|---|
| JP | 6-29081 | A | | 2/1994 | |
| JP | 8-96933 | A | | 4/1996 | |
| JP | 11-8102 | A | | 1/1999 | |
| JP | 2004-319493 | A | | 11/2004 | |
| JP | 2007-109640 | A | | 4/2007 | |
| JP | 3198844 | U | | 7/2015 | |
| JP | 2017-195182 | A | | 10/2017 | |
| JP | 2020-047519 | A | | 3/2020 | |
| KR | 10-2005-0103723 | A | | 11/2005 | |
| KR | 10-2006-0028620 | A | | 3/2006 | |
| KR | 20-2009-0007703 | U | | 7/2009 | |
| KR | 10-2012-0119120 | A | | 10/2012 | |
| KR | 10-1206413 | B1 | | 11/2012 | |
| KR | 10-2013-0122327 | A | | 11/2013 | |
| KR | 10-2017-0079890 | A | | 7/2017 | |
| KR | 10-2019-0137441 | A | | 12/2019 | |
| KR | 20200095752 | | * | 8/2020 | H05B 3/145 |
| KR | 10-2157442 | B1 | | 9/2020 | |
| KR | 10-2020-0124850 | A | | 11/2020 | |
| KR | 10-2021-0014852 | A | | 2/2021 | |

OTHER PUBLICATIONS

KR-20200095752 translation (Year: 2020).*

International Search Report for PCT/KR2022/001270 mailed May 6, 2022 from Korean Intellectual Property Office.

* cited by examiner

[Fig. 1]
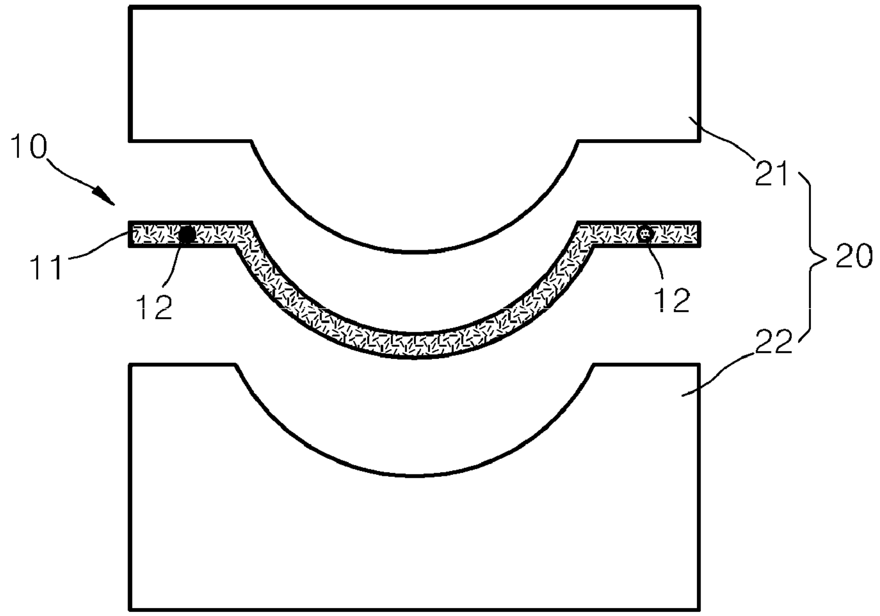
[Fig. 2]
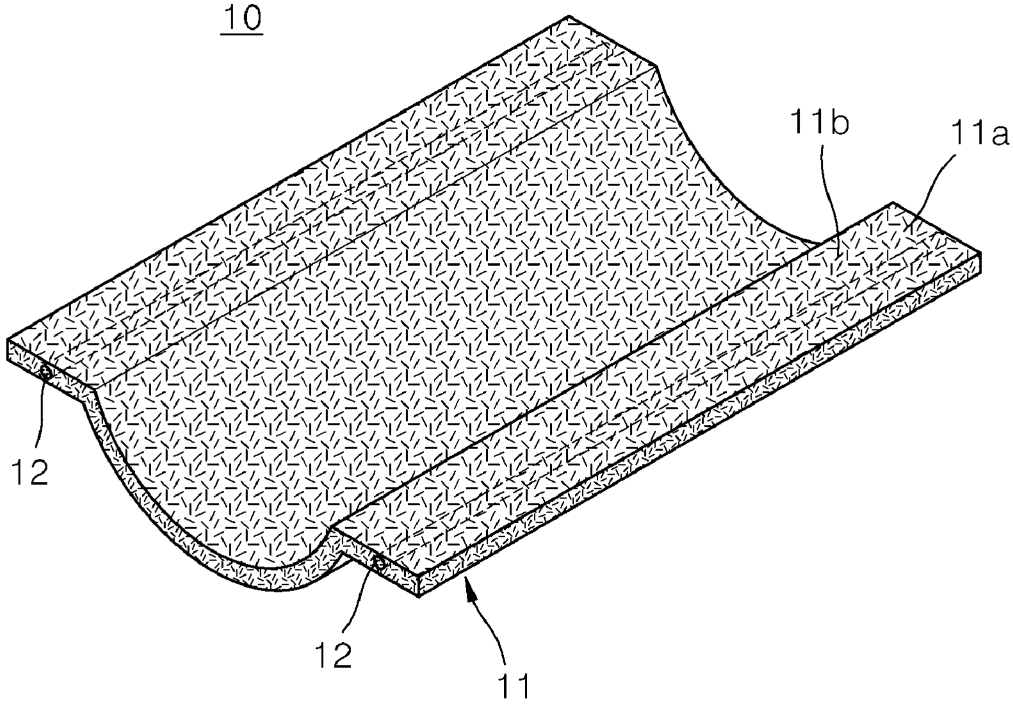

[Fig. 3]
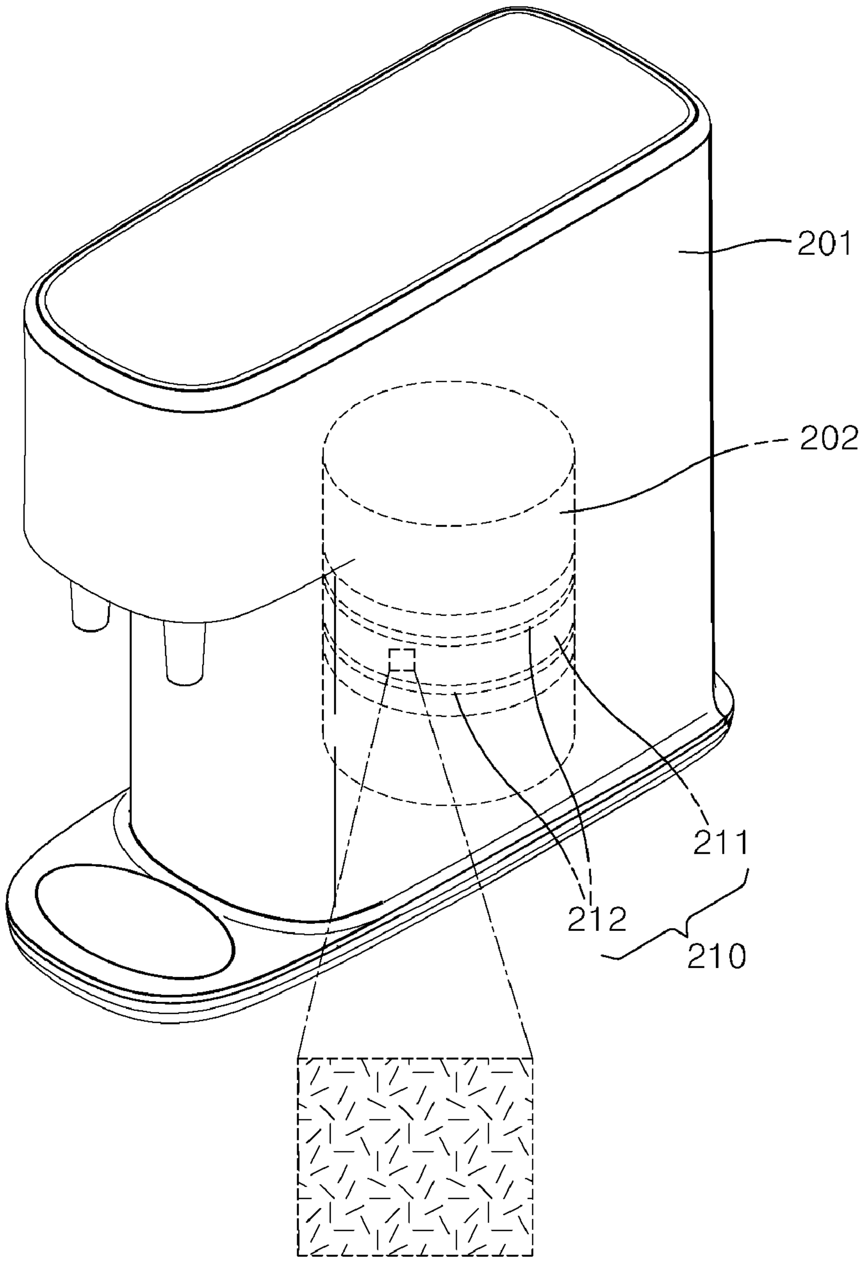

[Fig. 4]
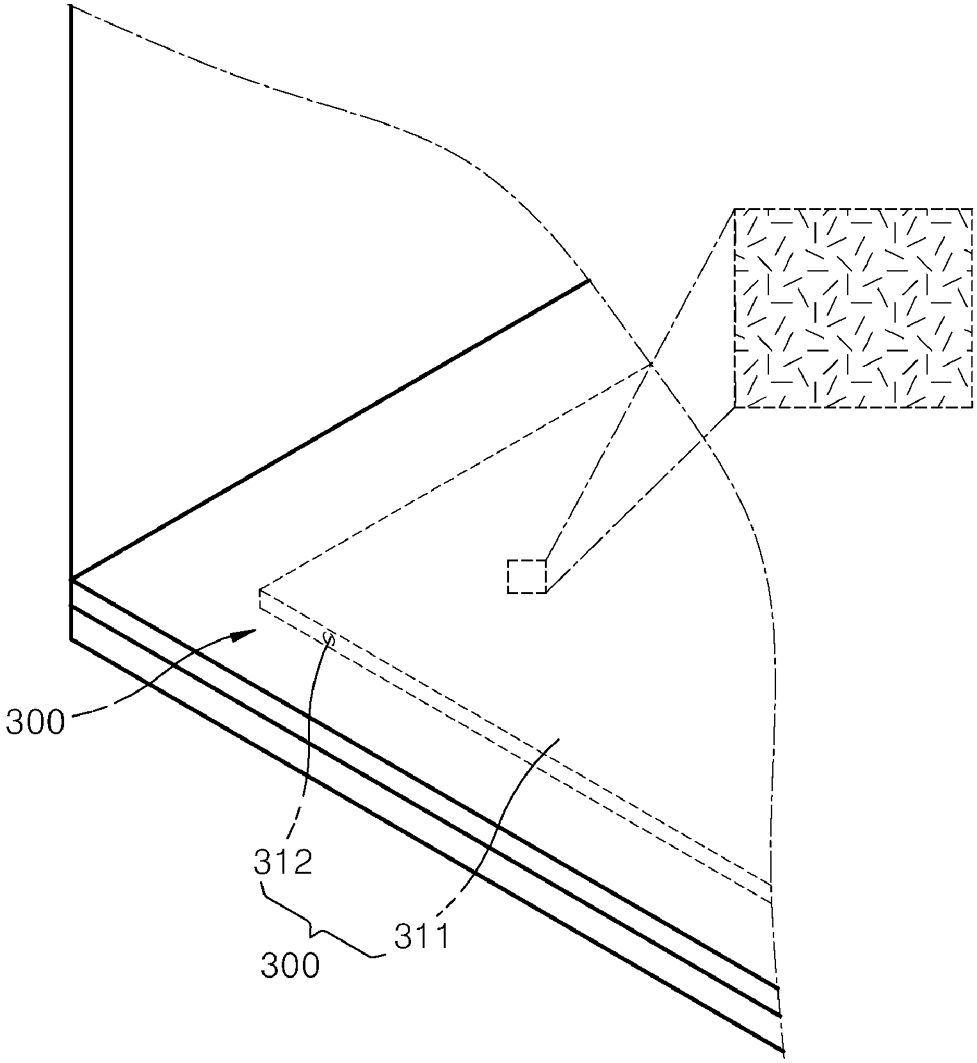

[Fig. 5]
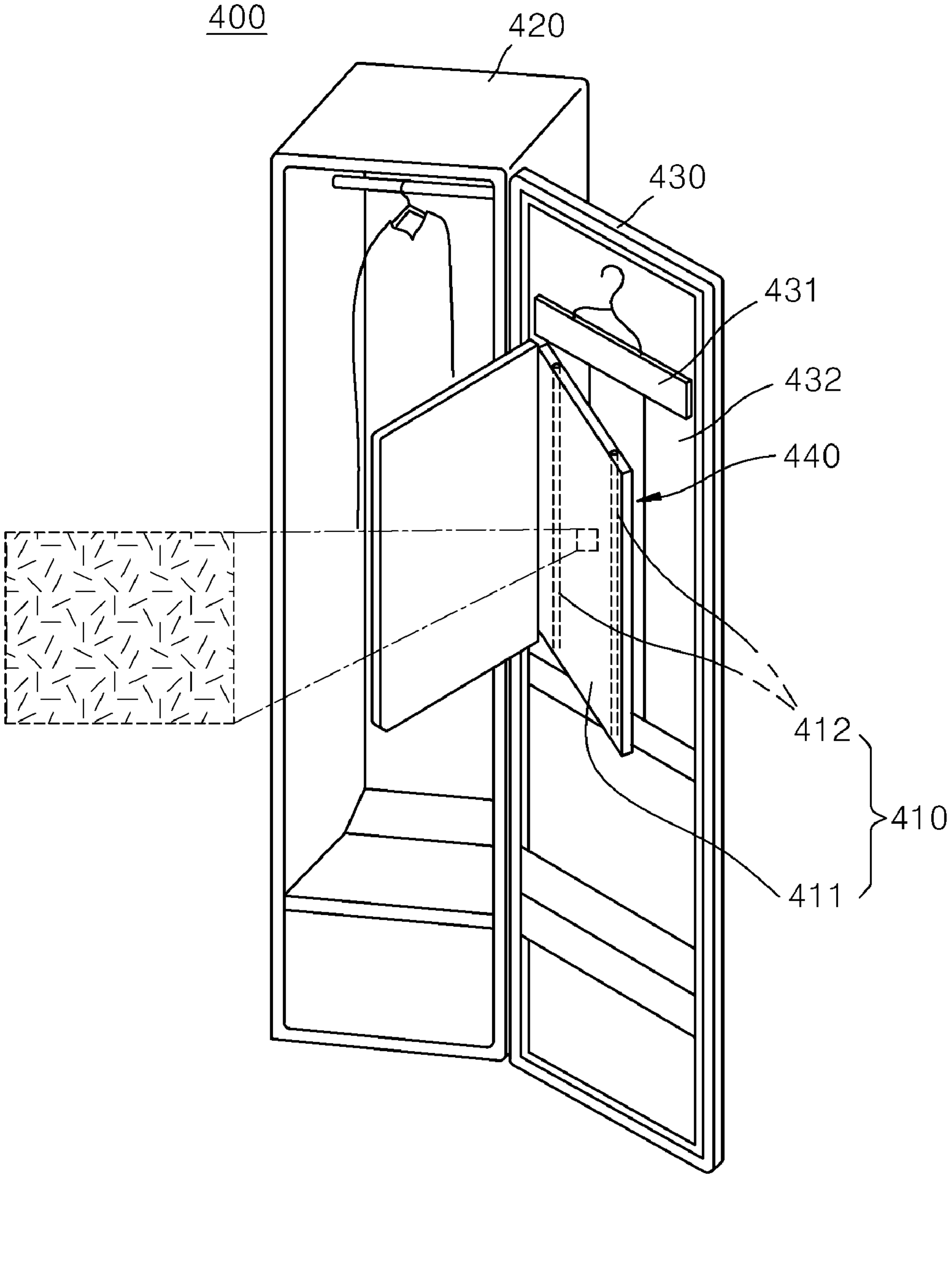

[Fig. 6]
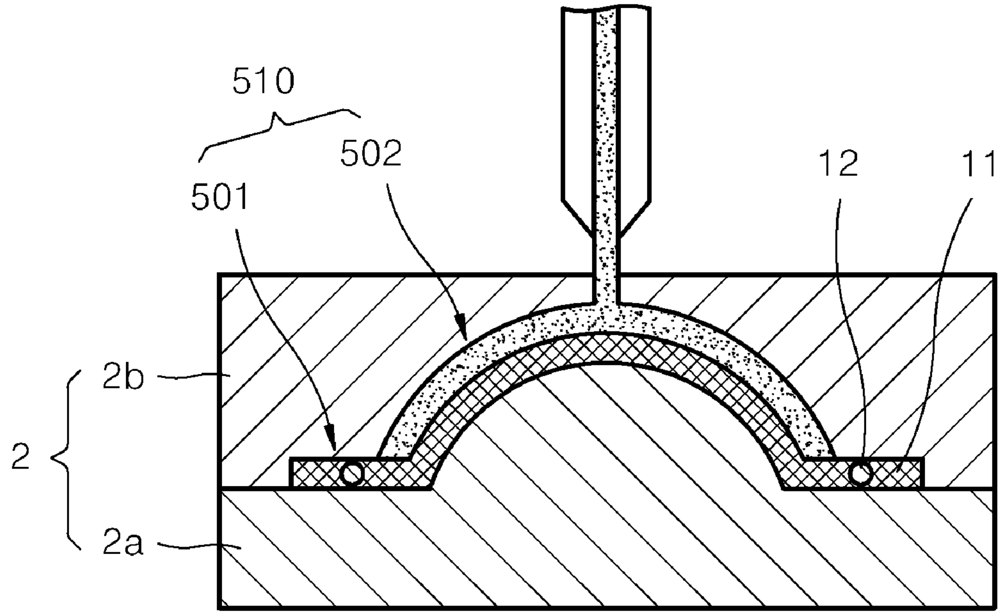
[Fig. 7]
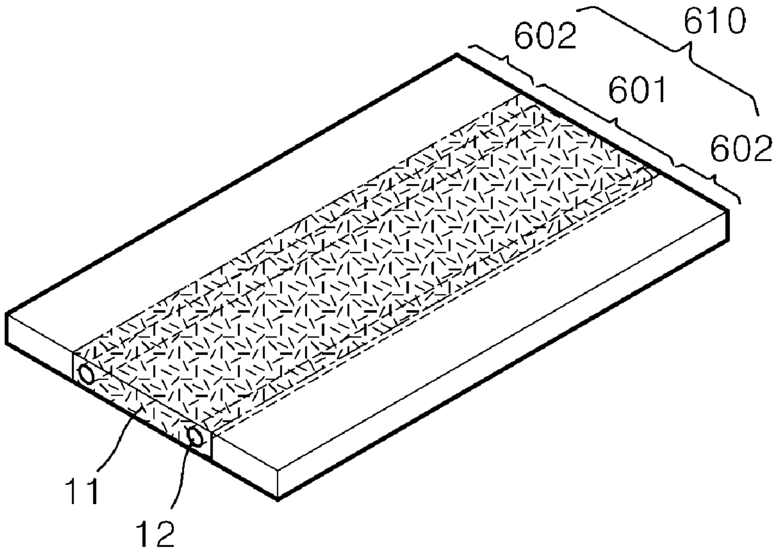

[Fig. 8]
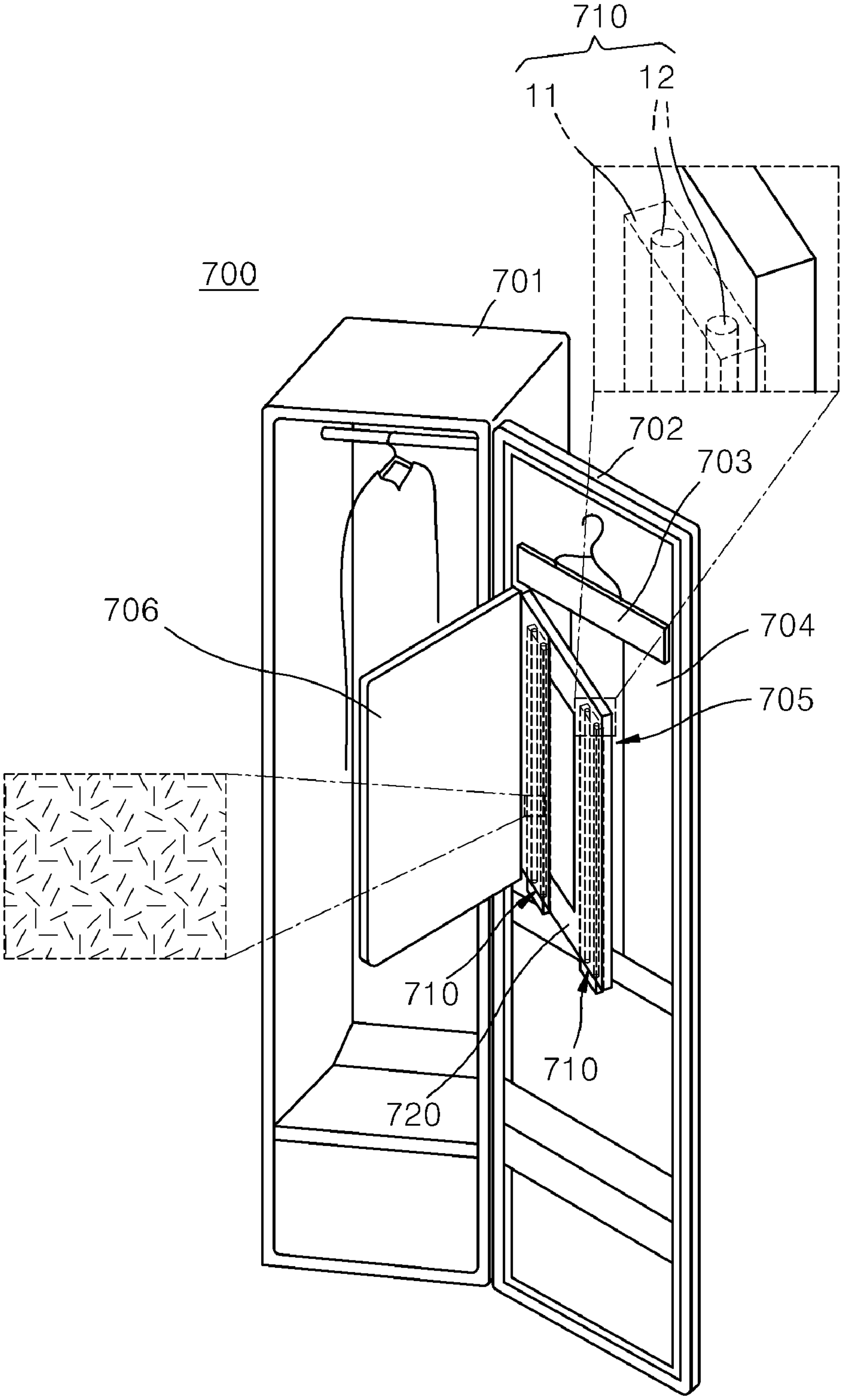

[Fig. 9]
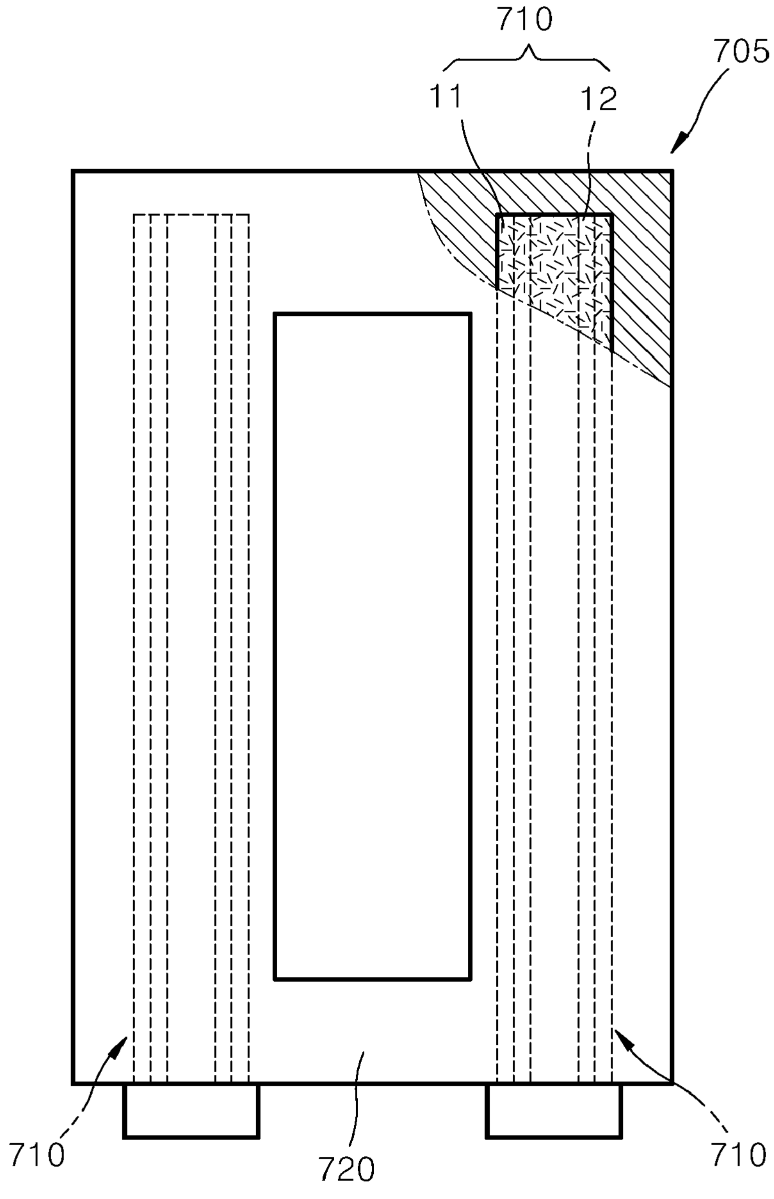

[Fig. 10]
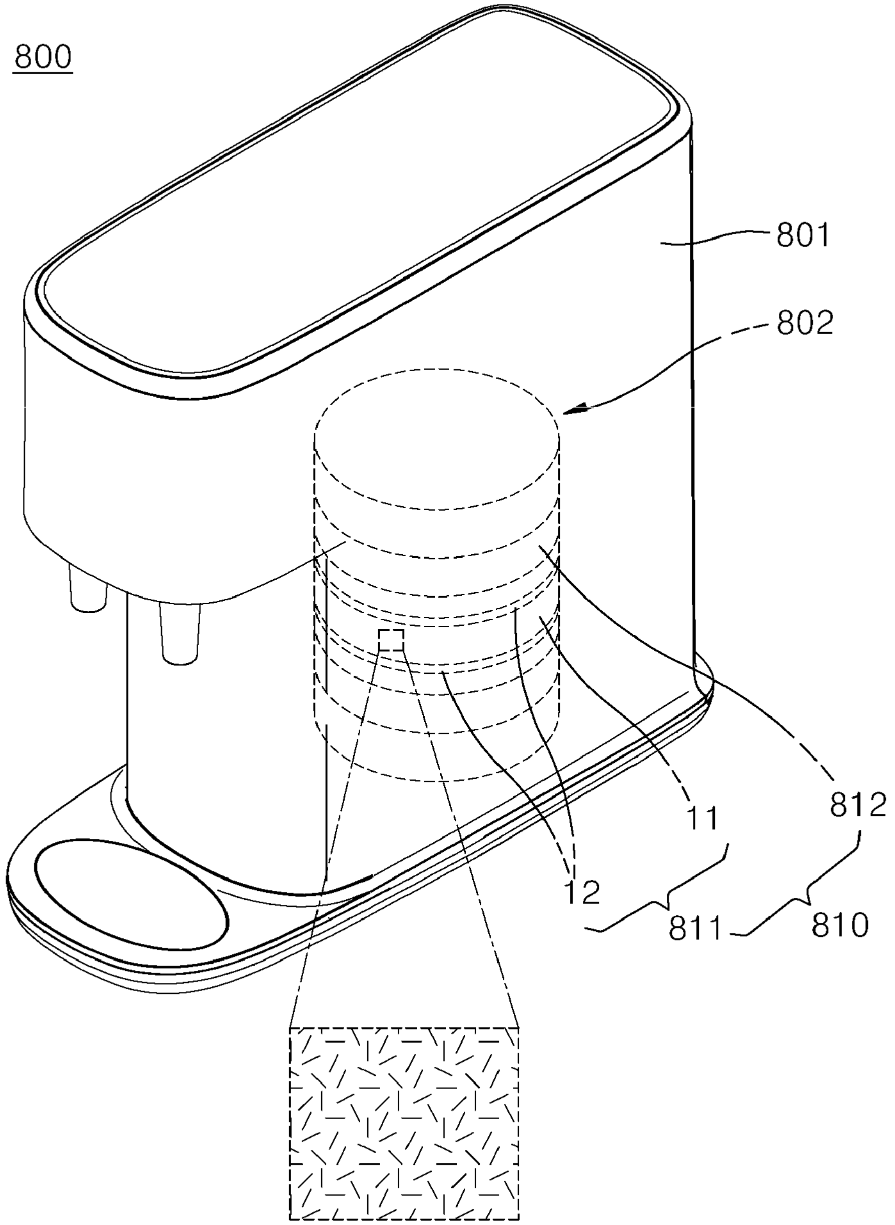

[Fig. 11]
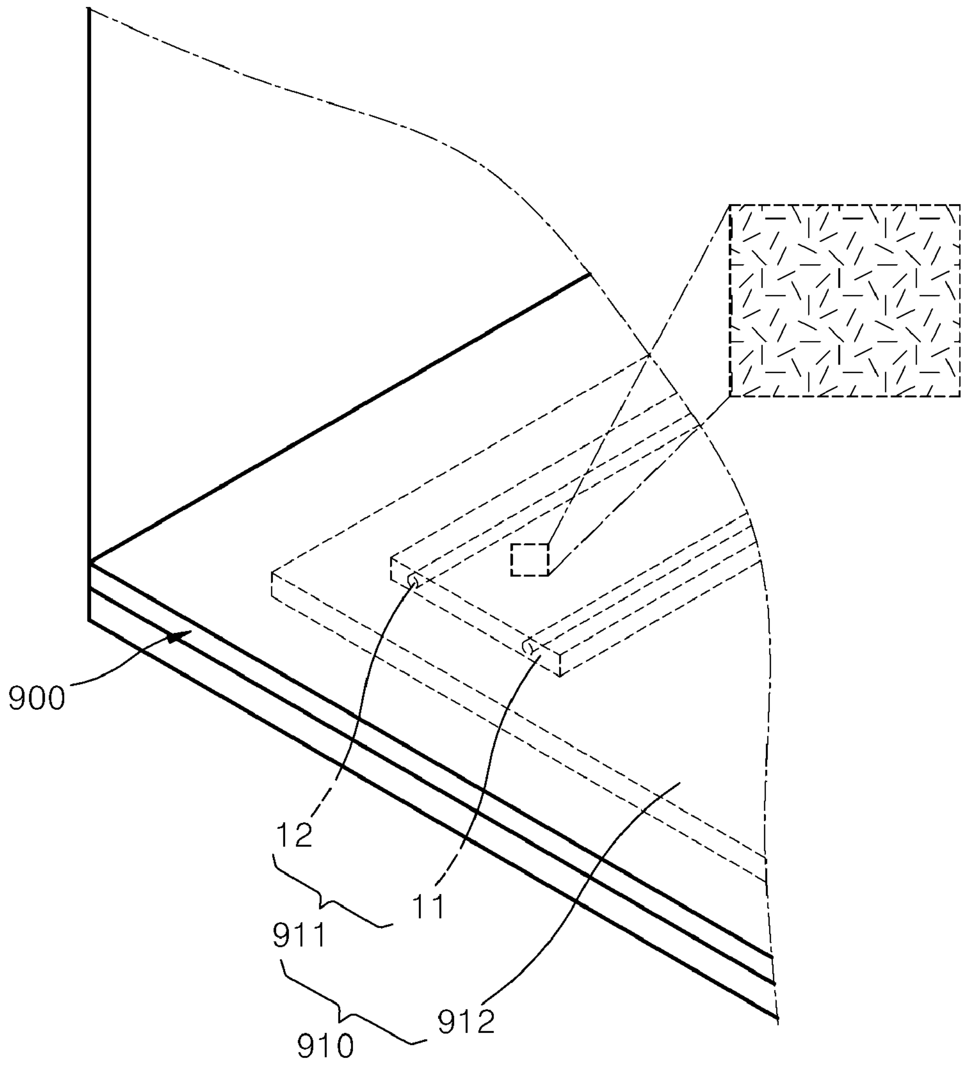

PLANAR HEATING ELEMENT, AND CLOTHING MANAGEMENT APPARATUS, HOT/COLD WATER PURIFIER AND FLOOR HEATING PANEL FOR BUILDING, COMPRISING THE SAME

TECHNICAL FIELD

The present invention relates to a planar heating element, a hot/cold water purifier, a floor heating panel for a building, and a clothing management apparatus using the planar heating element, and more particularly, to a planar heating element in which a pair of wires are inserted into a conductive composite material including a base resin and a conductive resin so that a manufacturing process is simple and heat can be generated when power is applied, a hot/cold water purifier, a floor heating panel for a building, and a clothing management apparatus including the planar heating element.

BACKGROUND ART

A commonly used electric heater is a typical sheath heater, and is a tubular heater in which a heating wire is embedded in a coil shape in a metal protective tube and filled with magnesium oxide, an insulating powder, to insulate the heating wire and the protective tube. These sheath heaters are robust against external physical impact and have high efficiency of electric thermal energy, and can be processed and used in various shapes suitable for the user's purpose and shape.

Recently, electric heaters are used in various products, and thus, concerns for planar heating elements that are more compact and can be easily manufactured are increasing.

Since planar heating elements according to the related art are manufactured by using a method of stacking a plurality of sheets or coating a heating layer on the plurality of sheets, a manufacturing process is complicated, and long manufacturing time is required.

DETAILED DESCRIPTION OF THE INVENTION

Technical Problem

The present invention provides a planar heating element which has a simple manufacturing process and can be manufactured in various shapes, a clothing management apparatus, a hot/cold water purifier, and a floor heating panel for a building including the planar heating element.

Technical Solution

According to an aspect of the present invention, there is provided a planar heating element including: a heating part, which is configured such that a pair of wires are inserted into a matrix formed by forming a conductive composite material in which a base resin and a conductive material are mixed with each other, to be spaced apart from each other by a predetermined distance, so that heat is generated by means of electrical resistance that is generated inside the matrix when power is applied, wherein the conductive material includes: carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and a content of the base resin in the conductive composite material is 60 to 72 w %, and a content of the carbon members in the conductive composite material is greater than or equal to 10 w % and less than or equal to 17 w % so as to form the electrical network, and a diameter of the metal powders in the conductive composite material is 10 nm to 100 nm, and a content of the metal powders is greater than or equal to 12 w % so as to increase an electrical network between the carbon members and to increase thermal conductivity of the conductive composite material, and is less than or equal to 22 w % so as to reduce specific gravity of the conductive composite material, and specific gravity (experimental results according to ASTM D792) of the conductive composite material is 0.8 to 1.3, resistivity of the conductive composite material is 2 to 10 $\Omega mm^2/m$, and thermal conductivity of the conductive composite material is 156 to 235 kcal/mh° C.

A tensile strength (experimental results according to ASTM D638) of the conductive composite material may be 180 to 200 kgf/cm 2.

The carbon members may include carbon nanotubes and graphene, and a mixture ratio of the graphene and the carbon nanotubes is 1 w %:10 w %.

The carbon members may include at least one of carbon fibers and carbon nanotubes, and a length of the carbon members may be 1 to 100 μm.

The metal powders may include aluminum powder.

The base resin may include a non-conductive resin including acrylonitrile-butadiene-styrene (ABS), silicon, polyethylene (PE), polyethylene terephthalate (PET), polypropylene (PP), or polydimethylsiloxane (PDMS), and a conductive resin including polypyrrole (PPy), and a content of the conductive resin in the base resin may be greater than 0 and may be less than or equal to 10 w %.

The conductive composite material may further include a stabilizer and additives, and a content of the stabilizer is 0.1 to 0.6 w %, and a content of the additives is 0.4 to 2.1 w %.

The wires may include at least one of aluminum wires, copper alloy wires, copper wires, and conductive composite material wires.

The planar heating element may further include a non-heating part that is distinguished from the heating part, is integrally formed and is formed of a material having lower electrical conductivity than the conductive composite material.

The wires may be insert-injection molded into the matrix, and the heating part and the non-heating part may be double injection molded.

According to another embodiment of the present invention, there is provided a clothing management apparatus using a planar heating element, the clothing management apparatus including an ironing board for removing wrinkle or forming knife creases of pants by pressing a clothing, wherein the ironing board is a planar heating element planar including a heating part, which is configured such that a pair of wires are inserted into a matrix formed by forming a conductive composite material in which a base resin and a conductive material are mixed with each other, to be spaced apart from each other by a predetermined distance, so that heat is generated by means of electrical resistance that is generated inside the matrix when power is applied, and the conductive material includes: carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and a content of the base resin in the conductive composite material is 60 to 72 w %, and a content of the carbon members in the conductive composite material is greater than or equal to 10 w % and less than or equal to 17 w % so as to form the electrical network, and a diameter of the metal powders in the conductive composite material is 10 nm to 100 nm, and a content of the metal powders is greater than or equal to 12 w % so as to increase an electrical network between the carbon members and to increase thermal conductivity of the conductive composite material, and is less than or equal to 22 w % so as to reduce specific gravity of the conductive composite material, and specific gravity (experimental results according to ASTM D792) of the conductive composite material is 0.8 to 1.3, resistivity of the conductive composite material is 2 to 10 $\Omega mm^2/m$, and thermal conductivity of the conductive composite material is 156 to 235 kcal/mh° C.

According to another aspect of the present invention, there is provided a hot/cold water purifier using a planar heating element, the hot/cold water purifier including a planar heating element provided to be in contact with at least one side of a hot water tank in which hot water is accommodated, wherein the planar heating element includes a heating part, which is configured such that a pair of wires are inserted into a matrix formed by forming a conductive composite material in which a base resin and a conductive material are mixed with each other, to be spaced apart from each other by a predetermined distance, so that heat is generated by means of electrical resistance that is generated inside the matrix when power is applied, and the conductive material includes: carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and a content of the base resin in the conductive composite material is 60 to 72 w %, and a content of the carbon members in the conductive composite material is greater than or equal to 10 w % and less than or equal to 17 w % so as to form the electrical network, and a diameter of the metal powders in the conductive composite material is 10 nm to 100 nm, and a content of the metal powders is greater than or equal to 12 w % so as to increase an electrical network between the carbon members and to increase thermal conductivity of the conductive composite material, and is less than or equal to 22 w % so as to reduce specific gravity of the conductive composite material, and specific gravity (experimental results according to ASTM D792) of the conductive composite material is 0.8 to 1.3, resistivity of the conductive composite material is 2 to 10 $\Omega mm^2/m$, and thermal conductivity of the conductive composite material is 156 to 235 kcal/mh° C.

According to another aspect of the present invention, there is provided a floor heating panel for a building using a planar heating element, the floor heating panel including a planar heating element provided on the floor heating panel for the building, wherein the planar heating element includes a heating part, which is configured such that a pair of wires are inserted into a matrix formed by forming a conductive composite material in which a base resin and a conductive material are mixed with each other, to be spaced apart from each other by a predetermined distance, so that heat is generated by means of electrical resistance that is generated inside the matrix when power is applied, and the conductive material includes: carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and a content of the base resin in the conductive composite material is 60 to 72 w %, and a content of the carbon members in the conductive composite material is greater than or equal to 10 w % and less than or equal to 17 w % so as to form the electrical network, and a diameter of the metal powders in the conductive composite material is 10 nm to 100 nm, and a content of the metal powders is greater than or equal to 12 w % so as to increase an electrical network between the carbon members and to increase thermal conductivity of the conductive composite material, and is less than or equal to 22 w % so as to reduce specific gravity of the conductive composite material, and specific gravity (experimental results according to ASTM D792) of the conductive composite material is 0.8 to 1.3, resistivity of the conductive composite material is 2 to 10 $\Omega mm^2/m$, and thermal conductivity of the conductive composite material is 156 to 235 kcal/mh° C.

According to another aspect of the present invention, there is provided a planar heating element including: a matrix formed by press-molding a composite material in which a non-electrical conductive resin and an electrical conductive material are mixed with each other; and at least a pair of wires inserted into the matrix to be spaced apart from each other by a predetermined distance and formed integrally with the matrix during press molding, wherein heat is generated by means of electrical resistance generated in the matrix when power is applied to the wires so that the wires have an electrical potential difference.

According to another aspect of the present invention, there is provided a hot/cold water purifier using a planar heating element, the planar heating element provided to be in contact with at least one side of a hot water tank in which hot water is accommodated, wherein the planar heating element includes a matrix formed by press-molding a composite material in which a non-electrical conductive resin and an electrical conductive material are mixed with each other, and at least a pair of wires inserted into the matrix to be spaced apart from each other by a predetermined distance and formed integrally with the matrix during press molding, wherein heat is generated by means of electrical resistance generated in the matrix when power is applied to the wires so that the wires have an electrical potential difference.

According to another aspect of the present invention, there is provided a floor heating panel for a building using a planar heating element, the planar heating element provided on the floor heating panel of the building, wherein the planar heating element includes a matrix being provided on the floor heating panel of the building and formed by press-molding a composite material in which a non-electrical conductive resin and an electrical conductive material are mixed with each other, and at least a pair of wires inserted into the matrix to be spaced apart from each other by a predetermined distance and formed integrally with the matrix during press molding, and heat is generated by means of electrical resistance generated in the matrix when power is applied to the wires so that the wires have an electrical potential difference.

According to another aspect of the present invention, there is provided a clothing management apparatus using a planar heating element, the clothing management apparatus provided on an ironing board for removing wrinkle or forming knife creases of pants by pressing a clothing, wherein the planar heating element includes a matrix formed by press-molding a composite material in which a non-electrical conductive resin and an electrical conductive material are mixed with each other, and at least a pair of wires inserted into the matrix to be spaced apart from each other by a predetermined distance and formed integrally with the matrix during press molding, and heat is generated by means of electrical resistance generated in the matrix when power is applied to the wires so that the wires have an electrical potential difference.

According to another aspect of the present invention, there is provided a planar heating element including: a heating part, which is configured such that a pair of wires are inserted into a matrix formed of a first material to be spaced apart from each other by a predetermined distance, so that heat is generated by means of electrical resistance that is generated inside the matrix when power is applied so that the wires have an electrical potential difference; and a non-heating part that is distinguished from the heating part, is integrally formed and is formed of a second material having lower electrical conductivity than that of the first material.

According to another aspect of the present invention, there is provided a clothing management apparatus including a planar heating element, the clothing management apparatus including an ironing board for removing wrinkle or forming knife creases of pants by pressing a clothing, wherein the ironing board includes a heating part, which is configured such that a pair of wires are inserted into a matrix formed of a first material to be spaced apart from each other by a predetermined distance, so that heat is generated by means of electrical resistance that is generated inside the matrix when power is applied so that the wires have an electrical potential difference; and a non-heating part that is distinguished from the heating part, is integrally formed and is formed of a second material having lower electrical conductivity than that of the first material.

According to another aspect of the present invention, there is provided a hot/cold water purifier including a planar heating element, the planar heating element provided to be in contact with at least one side of a hot water tank in which hot water is accommodated, wherein the planar heating element includes a heating part, which is configured such that a pair of wires are inserted into a matrix formed of a first material to be spaced apart from each other by a predetermined distance, so that heat is generated by means of electrical resistance that is generated inside the matrix when power is applied so that the wires have an electrical potential difference, and a non-heating part that is distinguished from the heating part, is integrally formed and is formed of a second material having lower electrical conductivity than that of the first material.

According to another aspect of the present invention, there is provided a floor heating panel of a building including a planar heating element, the planar heating element provided on the floor heating panel of the building, wherein the planar heating element includes a heating part, which is configured such that a pair of wires are inserted into a matrix formed of a first material to be spaced apart from each other by a predetermined distance, so that heat is generated by means of electrical resistance that is generated inside the matrix when power is applied so that the wires have an electrical potential difference, and a non-heating part that is distinguished from the heating part, is integrally formed and is formed of a second material having lower electrical conductivity than that of the first material.

Effects of the Invention

A planar heating element according to the present invention is configured such that a pair of wires are inserted into a matrix formed by forming a base resin and a conductive material, so that heat is generated by electrical resistance generated inside the matrix when power is applied and thus the planar heating element has a simple and is easy to manufacture and can achieve a sufficient heating effect regardless of thermal conductivity.

In addition, the planar heating element is divided into a heating part and a non-heating part, and the heating part and the non-heating part are integrally manufactured through a double injection molding method. Thus, the present invention has advantages in that various shapes of planar heating elements can be manufactured and that manufacturing costs and manufacturing time can be reduced due to the manufacturing process being simple.

In addition, the conductive material is manufactured by including carbon members and metal powders and by including the content of the carbon members in the conductive composite material that is 10 to 17 w %, by including the content of the metal powders that is 12 to 22 w % and by including the content of the base resin that is 60 to 72 w %, so that an electrical network can be easily formed by the carbon members and electrical resistance heat generated by the carbon members can be transferred to the surface of the heating part by the metal powders.

DESCRIPTION OF THE DRAWINGS

FIG. 1 is a view illustrating an example of a planar heating element according to a first embodiment of the present invention.

FIG. 2 is a view schematically illustrating a press molding method of the planar heating element according to a first embodiment of the present invention.

FIG. 3 is a view illustrating an example of a hot/cold water purifier using a planar heating element according to a second embodiment of the present invention.

FIG. 4 is a view illustrating an example of a floor heating panel for a building using a planar heating element according to a third embodiment of the present invention.

FIG. 5 is a view illustrating an example of a clothing management apparatus using a planar heating element according to a fourth embodiment of the present invention.

FIG. 6 is a view schematically illustrating a double injection molding method of a planar heating element according to a fifth embodiment of the present invention.

FIG. 7 is a view schematically illustrating a planar heating element according to a sixth embodiment of the present invention.

FIG. 8 is a view illustrating an example of a clothing management apparatus using a planar heating element according to a seventh embodiment of the present invention.

FIG. 9 is a view illustrating an ironing board shown in FIG. 8.

FIG. 10 is a view illustrating an example of a hot/cold water purifier using a planar heating element according to an eighth embodiment of the present invention.

FIG. 11 is a view illustrating an example of a floor heating panel for a building using a planar heating element according to a ninth embodiment of the present invention.

MODE OF THE INVENTION

Hereinafter, the present invention will be described in detail by describing embodiments of the present invention with reference to the accompanying drawings.

FIG. 1 is a view illustrating an example of a planar heating element according to a first embodiment of the present invention.

Referring to FIG. 1, a planar heating element 10 according to the first embodiment of the present invention includes a heating part that generates heat through a plane when power is applied, and has a shape of a sheet or film with a small thickness.

The heating part is formed by inserting a pair of wires 12 into a matrix 11 including a conductive composite material in which a base resin 11*a* and a conductive material 11*b* are mixed with each other, so that the conductive material forms an electrical network and generates heat when power is applied.

The conductive composite material includes the conductive material 11*b*, the base resin 11*a*, a stabilizer, and other additives.

The conductive material 11*b* includes carbon members and metal powders.

The carbon members include at least one of carbon fibers, carbon nanotubes, and graphene. The carbon members are dispersed into the base resin and form an electrical network. The content of the carbon members in the conductive composite material is greater than or equal to 10 w % and less than or equal to 17 w % in order to form the electrical network. In the present embodiment, the case where the carbon members are used by mixing carbon nanotubes (CNTs) and the graphene with each other, will be described. The length of the CNTs is 1 to 100 μm. The mixture ratio of the graphene and the CNTs may be 1 w %:20 w %.

The metal powders are interposed between the carbon members to increase an electrical network by means of the carbon members, and to increase thermal conductivity of the conductive composite material to transfer electrical resistance heat generated by the carbon members to the surface of the heating part. When the metal powders are not interposed, electrical resistance heat generated by the carbon members is not transferred to the surface of the heating part due to a non-conductive resin having very low thermal conductivity, so that the thermal conductivity of the conductive composite material is reduced to a similar level to the thermal conductivity of the non-conductive resin.

Thus, the diameter of the metal powders in the conductive composite material is 10 nm to 100 nm, and the content of the metal powders is greater than or equal to 12 w % so as to increase the electrical network between the carbon members and is less than or equal to 22 w % to increase thermal conductivity of the conductive composite material. In the present embodiment, the case where aluminum powders are used for the metal powders, will be described. However, the present invention is not limited thereto, and the conductive material may include silver nano materials.

The base resin 11*a* includes a non-conductive resin including acrylonitrile-butadiene-styrene (ABS), silicon, polyethylene (PE), polyethylene terephthalate (PET), polypropylene (PP), or polydimethylsiloxane (PDMS), and a conductive resin including polypyrrole (PPy).

In the present embodiment, the case where PP is used for the non-conductive resin and PPy is used for the conductive resin, will be described. The content of PPy in the base resin may be in the range of 0 to 10 w %, and in the present embodiment, the case where the mixture ratio of PP and PPy is 5 w %:95 w %, will be described. When PPy is added to the base resin 11*a*, the electrical characteristics of the conductive composite material can be enhanced. However, the present invention is not limited thereto, and the base resin 11*a* may also only include the non-conductive resin.

Meanwhile, the wires 12 are inserted into the matrix 11 to be spaced apart from each other by a predetermined distance and are integrally molded with the matrix during press molding.

The wires 12 include at least a pair. In the present embodiment, the case where a pair of wires 12 are arranged in the matrix 11, will be described. The wires 12 are arranged to be long in the lengthwise direction of the wires 12. The length or insertion position of the wires 12 may be changed in various manners and applied.

At least one of aluminum wires, copper alloy wires, copper wires, conductive composite material wires is used for the wires 12. The conductive composite material wires include carbon wires. In the present embodiment, the case where the wires 12 are copper wires, will be described. However, the present invention is not limited thereto, and any wires capable of supplying power can be applied in various manners. The wires 12 may be connected to a power supply device (not shown) provided outside the planar heating element 10 and may receive power.

In addition, a controller (not shown) for supplying or cutting off power and controlling the temperature may be connected to or provided in the planar heating element 10.

A manufacturing method of the planar heating element according to the first embodiment of the present invention having the above configuration will be described as below.

First, the carbon member, the aluminum powder, the base resin, the stabilizer, and the additives are mixed with each other at a predetermined ratio.

The content of the carbon member is set to be within the range of 10 to 17 w % with respect to the total content of the conductive composite material. The content of the carbon member is a parameter that affects the electrical conductivity of the conductive composite material, i.e., resistivity. When the content of the carbon member is less than 10 w %, the electrical network of the carbon member is not well formed and thus electrical conductivity is lowered. When the electrical conductivity is too low, there is no electricity, and the electrical resistance heat is not generated. Meanwhile, when the content of the carbon member exceeds 17 w %, the electrical conductivity does not increase more and thus, the content of the carbon member is less than or equal to 17 w % for cost reduction. That is, in the present invention, in order for the conductive composite material to have electrical conductivity in an appropriate range, the content of the carbon member is preferably within the range of 10 to 17 w %. In particular, the content of the carbon member is more preferably mixed at 12 to 15 w %.

In the present embodiment, the case where the carbon nanotubes and the graphene are used for the carbon member, will be described. In particular, the mixture ratio of the graphene and the carbon nanotubes is preferably 1 w %:10 w %.

In addition, the content of the aluminum powder is set to be within the range of 12 to 22 w % with respect to the total content of the conductive composite material. The content of the aluminum powder is a parameter that affects the electrical conductivity and the thermal conductivity of the conductive composite material. When the content of the aluminum powder is less than 12 w %, the aluminum powder does not serve as an electrical network between the carbon nanotubes and does not sufficiently serve as thermal conduction of transferring electrical resistance heat generated by the carbon members to the surface of the heating part. Meanwhile, when the content of the aluminum powder exceeds 22 w %, the specific gravity of the conductive composite material increases. Thus, the content of the aluminum powder is preferably within the range of 12 to 22 w %. In particular, the content of the aluminum powder is more preferably mixed at 15 to 20*w*%. By adding the aluminum powder, costs can be reduced compared to the case where only the carbon members are used, and the electrical conductivity and the thermal conductivity of the conductive composite material can be more enhanced.

In addition, the content of the base resin in the conductive composite material is mixed at 60 to 72 w %, the content of the stabilizer is 0.1 to 0.6 w %, and the content of the additives is 0.4 to 2.1 w %.

In addition, the case where the base resin is formed by adding PPy to PP, will be described. The content of PPy in the base resin is 0 to 10 w %. In particular, the content of PPy is more preferably 5 w %.

The conductive composite material mixed at an optimum ratio as described above is inserted into a pre-manufactured lower mold 22.

The composite material is inserted into the lower mold 22, and the pair of wires 12 are inserted in a predetermined position. The pair of wires 12 are disposed to be spaced apart from each other by a predetermined distance.

In the present embodiment, the case where the conductive composite material is first inserted into the lower mold 22 and then the wires 12 are inserted, will be described, but the present invention is not limited thereto, and after the wires 12 are first arranged, the conductive composite material may also be inserted. In addition, when the conductive composite material is first inserted, the conductive composite material may also be additionally inserted after the wires 12 are inserted.

Subsequently, when high-temperature pressurization is performed with the upper mold 21, the planar heating element 10 in which the wires 12 are integrally formed in the matrix 11 is formed.

Thus, since the planar heating element 10 with the wires 12 can be formed by using one press molding process, a manufacturing method is very simple, and manufacturing time and costs can be reduced.

In addition, the planar heating element 10 can be manufactured in various shapes, and thus can be applied to more various products.

The results of experiments of the conductive composite material manufactured by using the above-described method are as follows.

The specific gravity (experiment results according to ASTM D792) of the conductive composite material is 0.8 to 1.3. The resistivity of the conductive composite material is 2 to 10 $\Omega mm^2/m$. The content of the carbon nanotubes and the aluminum powder is mixed at an optimum ratio and manufactured so that the conductive composite material has an optimum resistivity and thus may have appropriate electrical conductivity and thermal conductivity.

The thermal conductivity of the conductive composite material is 156 to 235 kcal/mh° C. Since the thermal conductivity may be changed according to the content of the aluminum powder, in the present embodiment, the content of the aluminum powder is set to be within 12 to 22 w % so that the conductive composite material may be within the thermal conductivity. Thus, the aluminum powder is mixed so that the thermal conductivity of the conductive composite material increases and electrical resistance heat generated by the carbon members can be effectively transferred to the surface of the heating part.

The tensile strength (experiment results according to ASTM D638) of the conductive composite material is 180 to 200 kgf/cm 2, and tensile elongation (experiment results according to ASTM D638) is 22 to 27 w %, flexural modulus (experiment results according to ASTM D790) is 1200 to 1300 kgf/cm 2, and flexural strength (experiment results according to ASTM D790) is 200 to 220 kgf/cm 2.

The operation of the planar heating element according to the first embodiment of the present invention having the above configuration will be described as below.

When power is applied to the pair of wires 12 so that an electric potential difference is generated therein, conductive materials form an electrical network inside the matrix 11, and heat is generated by electrical resistance generated inside the matrix 11.

Thus, heat may be generated in the entire plane of the planar heating element 10.

In the planar heating element according to the first embodiment of the present invention having the above configuration, the wires 12 are integrally provided inside the matrix 11 formed of the conductive composite material so that the structure is simple, a manufacturing method is very simple, and manufacturing time and costs can be reduced. That is, the number of processes can be reduced compared to the case where the planar heating element is manufactured by connecting wires separately or by stacking a plurality of sheets and terminals, and manufacturing is easy.

In addition, the planar heating element is configured in such a way that heat is generated by electrical resistance generated inside the matrix 11 when power is applied to the pair of wires 12 so that the wires 12 have an electrical potential difference and thus sufficient heating effect can be achieved regardless of the thermal conductivity of the matrix 11 or the wires 12. That is, in the case of inserting a heating terminal inside the matrix, sufficient heating effect can be obtained only when both the heating terminal and the matrix have high thermal conductivity, whereas in the present invention, by inserting a wire rather than a heating terminal into the matrix to conduct electricity, heat is generated in the matrix and thus, sufficient heating effect can be obtained regardless of the thermal conductivity.

Meanwhile, FIG. 3 is a view illustrating an example of a hot/cold water purifier using a planar heating element according to a second embodiment of the present invention.

Referring to FIG. 3, a hot/cold water purifier 200 using a planar heating element 210 according to the second embodiment of the present invention includes a main body 201 and a hot water tank 202, which is provided inside the main body 201 and in which hot water is accommodated, and the planar heating element 210 according to the second embodiment is different from that of the first embodiment in that the planar heating element 210 is provided to be in contact with at least one side of the hot water purifier 202, and the other configurations and operations thereof are similar to those of the first embodiment and thus, differences will be described in detail.

The case where the planar heating element 210 is provided to surround an outer circumferential surface of the hot/cold water tank 202, will be described. However, the present invention is not limited thereto, and the planar heating element 210 may be applied to any plane on which heat can be transferred to the hot water tank 202, such as a floor of the hot water tank 202.

The planar heating element 210 may have the shape of a sheet or film with a small thickness and is formed of a flexible material and thus is easy to be combined with the hot water tank 202.

The configuration and manufacturing method of the planar heating element 210 are applied in the same manner as in the first embodiment.

Meanwhile, FIG. 4 is a view illustrating an example of a floor heating panel for a building using a planar heating element according to a third embodiment of the present invention.

Referring to FIG. 4, a floor heating panel for a building using a planar heating element 310 according to a third embodiment of the present invention is a panel installed at a floor surface of the building and for floor heating and the planar heating element 310 is provided on the floor heating panel 300, and the planar heating element 310 according to the third embodiment is different from that of the first embodiment in that the planar heating element 310 is provided on the floor heating panel 300, and the other configurations and operations thereof are similar to those of the first embodiment and thus, differences will be described in detail.

The planar heating element 310 may be provided inside or on an upper surface of the floor heating panel 300.

The planar heating element 310 may have a shape of a sheet or film with a small thickness, and at least one planar heating element 310 may be provided on the floor heating panel 300.

The planar heating element 310 may have a shape of a sheet or film with a small thickness, and at least one planar heating element 310 may be provided on the floor heating panel 300.

The configuration and manufacturing method of the planar heating element 310 are applied in the same manner as in the first embodiment.

Meanwhile, FIG. 5 is a view illustrating an example of a clothing management apparatus using a planar heating element according to a fourth embodiment of the present invention.

Referring to FIG. 5, a clothing management apparatus 400 using a planar heating element 410 according to a fourth embodiment of the present invention includes a main body 420, a door 430, and an ironing board 440 provided on the door 430 to remove wrinkle or form knife creases on pants by pressurizing a clothing, and the planar heating element 410 according to the fourth embodiment is different from that of the first embodiment in that the planar heating element 410 is provided on the ironing board 440, and the other configurations and operations thereof are similar to those of the first embodiment, and differences will be described in detail.

The main body 420 forms a space in which the clothing can be put, and a front surface of the main body 420 is opened.

The door 430 is formed to open/close the front surface of the main body 420.

A gripper 431, a support plate 432, a pressure plate 433, and the ironing board 440 are provided on an inner surface of the door 430.

The gripper 431 is a holder that is provided on an upper portion of the inner surface of the door 430 and grips ends of pants P.

The support plate 432 is a panel that is fixed to the inner surface of the door 430 and is disposed opposite to the pants P hung in the gripper 431. The support plate 432 supports the ironing board 440 and the pressure plate 433 to press the pants P.

The pressure plate 433 is a panel that is rotatably coupled to the support plate 432 and presses the ironing board 440 in a direction toward the support plate 432.

The ironing board 440 is disposed between the pressure plate 433 and the support plate 432 and is rotatably coupled to the support plate 432.

The planar heating element 410 may be attached to an inside of the ironing board 440 or a surface toward the pants P. The planar heating element 410 may have a shape of a sheet or film with a small thickness, and at least one planar heating element 410 may be provided.

The configuration and manufacturing method of the planar heating element 410 are applied in the same manner as in the first embodiment.

The present invention is not limited to the above-described embodiments, and the planar heating element may be applied to a fire board for grilled meat.

Meanwhile, FIG. 6 is a view schematically illustrating a double injection molding method of a planar heating element according to a fifth embodiment of the present invention.

Referring to FIG. 6, a planar heating element 510 according to a fifth embodiment of the present invention is divided into a heating part 510 that generates heat through a plane when power is applied, and a non-heating part 502 that does not heat when power is applied. That is, in the planar heating element 510, the heating part 501 and the non-heating part 502 are integrally formed, and the planar heating element 510 is divided into the heating part 501 that is a heating area, and the non-heating part 502 that is a non-heating area.

The heating part 501 is integrally formed with the non-heating part 502, and is formed of a different material from that of the non-heating part 502 and has a different electrical conductivity from that of the non-heating part 502.

The heating part 501 is formed by inserting a pair of wires 12 into the matrix 11 formed of a conductive composite material in which the base resin 11*a* and the conductive material 11*b* are mixed with each other, so that the conductive material forms an electrical network and generates heat when power is applied.

The conductive composite material includes the conductive material 11*b*, the base resin 11*a*, a stabilizer, and other additives.

The conductive material 11*b* includes carbon members and metal powders.

The carbon members include at least one of carbon fibers, carbon nanotubes, and graphene. The carbon members are dispersed into the base resin and form an electrical network. The content of the carbon members in the conductive composite material is greater than or equal to 10 w % and less than or equal to 17 w % so as to form the electrical network. In the present embodiment, the case where the carbon members are used by mixing CNTs and the graphene with each other, will be described. The length of the CNTs may be 1 to 100 μm. The mixture ratio of the graphene and the CNTs is preferably 1 w %:20 w %.

The metal powders are interposed between the carbon members, increase an electrical network by the carbon members, increase the thermal conductivity of the conductive composite material, and transfer electrical resistance heat generated by the carbon members to the surface of the heating part. When the metal powders are not interposed, electrical resistance heat generated by the carbon members is not transferred to the surface of the heating part due to a non-conductive resin having very low thermal conductivity, so that the thermal conductivity of the conductive composite material is reduced to a similar level to the thermal conductivity of the non-conductive resin.

Thus, the diameter of the metal powder in the conductive composite material is 10 nm to 100 nm, and the content of the metal powder is greater than or equal to 12 w % so as to increase an electrical network between the carbon members and the thermal conductivity of the conductive composite material, and the content of the metal powder is less than or equal to 22 w % so as to reduce the specific gravity of the conductive composite material. In the present embodiment, the case where the metal powders are aluminum powders, will be described. However, the present invention is not limited thereto, and the conductive material may include silver nano materials.

The base resin 11*a* includes a non-conductive resin including acrylonitrile-butadiene-styrene (ABS), silicon, polyethylene (PE), polyethylene terephthalate (PET), polypropylene (PP), or polydimethylsiloxane (PDMS), and a conductive resin including polypyrrole (PPy).

In the present embodiment, the case where the non-conductive resin is PP and the conductive resin is PPy, will be described. The content of PPy in the base resin is in the range of 0 to 10 w %, and in the present embodiment, the case where the mixture ratio of PP and PPy is 5 w %:95 w %, will be described. When PPy is added to the base resin 11*a*, the electrical characteristics of the conductive composite material can be enhanced. However, the present invention is not limited thereto, and the base resin 11*a* may include only the non-conductive resin.

The non-heating part 502 is formed of a material having lower electrical conductivity than the heating part 501. The case where the non-heating part 502 is formed of only the non-conductive resin, will be described. However, the present invention is not limited thereto, and the non-heating part 502 may include the same material as the material of the base resin of the heating part 501. The non-conductive resin of the heating part 501 and the non-conductive resin of the non-heating part 502 may be formed of the same material, and when the non-conductive resin of the heating part 501 and the non-conductive resin of the non-heating part 502 are integrally formed, interfacial separation etc. can be prevented.

The configuration of the wires 12 is applied in the same manner as in the first embodiment.

In addition, a controller (not shown) for supplying or cutting off power and controlling the temperature may be connected to the planar heating element 510, or the planar heating element 510 may include the controller (not shown).

A manufacturing method of a planar heating element according to a fifth embodiment of the present invention having the above configuration will be described below.

The planar heating element 510 according to the fifth embodiment of the present invention having the above configuration is different from that of the first embodiment in that the heating part 501 and the non-heating part 502 are manufactured by double injection molding, and the other configurations and operations thereof are applied in the same manner as in the first embodiment.

In the embodiment, the case where a mold 2 for double injection molding includes a lower mold 2*a* and an upper mold 2*b* and only the upper mold 2*b* is replaced, will be described. That is, the upper mold 2*b* includes an upper mold for a heating part and an upper mold for a non-heating part. Thus, the upper mold (not shown) for the heating part is disposed on the lower mold 2*a*, and the conductive composite material is put to mold the heating part 501. Subsequently, the upper mold (not shown) for the non-heating part is replaced on the lower mold 2*a* so that the non-conductive resin is put to mold the non-heating part 502.

First, the conductive composite material in which the carbon member, the aluminum powder, the base resin, the stabilizer and the additives are mixed with each other at a predetermined ratio, is injected between the lower mold 2*a* and the upper mold for the heating part (not shown).

In this case, the pair of wires 12 are inserted in a preset position, and the conductive composite material is hardened by heating the mold 2.

In the present embodiment, the case where the conductive composite material is first injected into the mold 20 and then the wires 12 are inserted, will be described, but the present invention is not limited thereto, and the wires 12 are first arranged and then, the conductive composite material may also be injected. In addition, when the conductive composite material is first injected, the wires 12 are inserted and then the conductive composite material may also be additionally injected.

Thus, the heating part 501 into which the wires 12 are inserted, is formed in the matrix 11 formed of the conductive composite material.

Subsequently, by replacing an upper mold for the non-heating part, the non-conductive resin is injected between the lower mold 2*a* and the upper mold for the non-heating part and is hardened.

Thus, the non-heating part 502 including the non-conductive resin and integrally molded with the heating part 501 is formed.

When the hardening is completed, the planar heating element 510 is separated from the mold 2.

Thus, the planar heating element 510 having an area divided into the heating part 501 and the non-heating part 502 through a double injection molding process is manufactured so that manufacturing can be performed in various shapes and a manufacturing process is simple and thus manufacturing time and manufacturing costs can be reduced.

The planar heating element 510 is molded in such a way that only a part of the planar heating element 510 is formed of the heating part 501 and thus, manufacturing can be performed in various shapes and thus the planar heating element 510 can be applied to more various products.

In addition, the non-conductive resin included in the heating part 501 and the non-conductive resin included in the non-heating part 502 are formed of the same material so that they can be more robustly coupled to each other and molded while the interface between the heating part 501 and the non-heating part 502 is not separated.

In addition, since the carbon nanotubes, which are conductive materials included in the heating part 501, may serve as a bridge connecting the interface between the heating part 501 and the non-heating part 502, the heating part 501 and the non-heating part 502 can be more robustly coupled to each other.

However, the present invention is not limited thereto, and a first material for forming the matrix of the heating part 501 and a second material for forming the non-heating part 502 can be respectively injected into one mold so that double injection molding can be performed, and various molds for double injection molding can be applied.

Meanwhile, FIG. 7 is a view schematically illustrating a planar heating element according to sixth embodiment of the present invention.

Referring to FIG. 7, a planar heating element 610 according to a sixth embodiment of the present invention is divided into a heating part 601 and a non-heating part 602, and is different from that of the fifth embodiment in that the non-heating part 602 extends to at least one side of both right and left sides of the heating part 601, and the other configurations and operations thereof are similar to those of the fifth embodiment, and thus differences will be described in detail.

The heating part 601 is integrally formed with the non-heating part 602, and is formed of a different material from that of the non-heating part 602 and thus has different electrical conductivity from that of the non-heating part 602.

The heating part 601 is formed by inserting a pair of wires 12 into the matrix 11 including the conductive composite material in which the base resin 11*a* and the conductive material 11*b* are mixed with each other, so that the conductive material forms an electrical network and generates heat when power is applied.

The non-heating part 602 is formed of a material having low electrical conductivity than that of the heating part 601. The case where the non-heating part 602 includes only the non-conductive resin, will be described. However, the present invention is not limited thereto, and the non-heating part 602 may also include the same material as a material of a base resin of the heating part 601. A non-conductive resin of the heating part 501 and a non-conductive resin of the non-heating part 502 are formed of the same material when they are integrally formed, interfacial separation etc. can be prevented.

The configuration of the heating part 601, the non-heating part 602, and the wires 12 are applied in the same manner as in the fifth embodiment. In addition, the manufacturing method of the planar heating element is applied in the same manner as in the fifth embodiment.

FIG. 8 is a view illustrating an example of a clothing management apparatus using a planar heating element according to a seventh embodiment of the present invention. FIG. 9 is a view illustrating an ironing board shown in FIG. 8.

Referring to FIGS. 8 and 9, a clothing management apparatus 700 using a planar heating element according to a seventh embodiment of the present invention includes a main body 701, a door 702, and an ironing board 705 provided on the door 702 and for removing wrinkle or forming knife creases on pants by pressing a clothing, and the planar heating element according to the seventh embodiment is different from that of the fifth embodiment in that the ironing board 705 is a planar heating element divided into aa heating part 710 and a non-heating part 720, and the other configurations and operations thereof are similar to those of the fifth embodiment, and differences will be described in detail.

The main body 701 forms a space in which the clothing can be put, and a front surface of the main body 701 is opened.

The door 702 is formed to open/close the front surface of the main body 701.

A gripper 703, a support plate 704, a pressure plate 706, and the ironing board 705 are provided on an inner surface of the door 702.

The gripper 703 is a holder that is provided on an upper portion of the inner surface of the door 702 and grips ends of pants.

The support plate 704 is a panel that is fixed to the inner surface of the door 702 and is disposed opposite to the pants hung in the gripper 703. The support plate 704 supports the ironing board 705 and the pressure plate 706 to press the pants.

The pressure plate 706 is a panel that is rotatably coupled to the support plate 704 and presses the ironing board 705 in a direction toward the support plate 704.

The ironing board 705 is disposed between the pressure plate 706 and the support plate 704 and is rotatably coupled to the support plate 703.

At least a portion of the ironing board 705 can be formed as the planar heating element, and in the present invention, the case where the ironing board 705 is a planar heating element, will be described.

The ironing board 705 is double-injection-molded by using different materials so as to be divided into the heating part 710 and the non-heating part 720. In the present embodiment, the case where two heating parts 710 are provided at both right and left sides of the ironing board 705, will be described.

The configuration and operations of the heating part 710 and the non-heating part 720 are applied in the same manner as in the fifth embodiment. In addition, the manufacturing method and operating method of the planar heating element are applied in the same manner as in the fifth embodiment.

FIG. 10 is a view illustrating an example of a hot/cold water purifier using a planar heating element according to an eighth embodiment of the present invention.

Referring to FIG. 10, a hot/cold water purifier 800 using a planar heating element according to the eighth embodiment of the present invention includes a main body 801, and a hot water tank 802, which is provided inside the main body 801 and in which hot water is accommodated, and the planar heating element according to the eight embodiment is different from that of the fifth embodiment in that the planar heating element 810 is provided to be in contact with at least one side of the hot water tank 802, and the other configuration and operations thereof are similar to those of the fifth embodiment, and differences will be described in detail.

The case where the planar heating element 810 is provided to surround an outer circumferential surface of the hot water tank 802, will be described. However, the present invention is not limited thereto, and the planar heating element 810 may be applied to any surface on which heat can be transferred to the hot water tank 802, such as a floor of the hot water tank 802.

The planar heating element 810 is formed by being divided into a heating part 811 and a non-heating part 812. That is, all of the other portions of the planar heating element 810 except for the heating part 811 correspond to the non-heating part 812.

The configuration and operations of the heating part 811 and the non-heating part 812 are applied in the same manner as in the fifth embodiment. In addition, the manufacturing method and operating method of the planar heating element 810 are applied in the same manner as in the fifth embodiment.

Meanwhile, FIG. 11 is a view illustrating an example of a floor heating panel for a building using a planar heating element according to a ninth embodiment of the present invention.

Referring to FIG. 11, a floor heating panel 900 for a building using a planar heating element 910 according to the ninth embodiment of the present invention is a panel installed on the floor of the building and for floor heating, and the planar heating element 910 according to the ninth embodiment is different from that of the first embodiment in the planar heating element 910 is provided on the floor heating panel 900, and the other configuration and operations thereof are similar to those of the first embodiment, and differences will be described in detail.

The planar heating element 910 may be provided inside or on an upper surface of the floor heating panel 900.

The planar heating element 910 is molded by being divided into a heating part 911 and a non-heating part 912. That is, the other portions of the planar heating element 910 except for the heating part 911 correspond to the non-heating part 912.

The configuration and operations of the heating part 911 and the non-heating part 912 are applied in the same manner as in the fifth embodiment. In addition, the manufacturing method and operating method of the planar heating element 910 are applied in the same manner as in the fifth embodiment.

According to the present invention, in the above-described embodiments, the content of the base resin, the content of the carbon member, and the diameter and content of the metal powder have been exemplified, but the present invention is not limited thereto but may be changed. In addition, values of the specific gravity, resistivity, and thermal conductivity have been exemplified, but the present invention is not limited thereto.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a planar heating element which has a simple structure and in which manufacturing costs and manufacturing time can be reduced, a clothing management apparatus, a hot/cold water purifier, and a floor heating panel for a building including the planar heating element can be manufactured.

The invention claimed is:

1. A planar heating element comprising a heating part, which is configured such that a pair of wires are inserted into a matrix formed by forming a conductive composite material in which a base resin and a conductive material are mixed with each other, the pair of wires being spaced apart from each other by a predetermined distance, so that heat is generated by means of electrical resistance that is generated inside the matrix when power is applied, wherein the conductive material comprises:

carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and an amount of the base resin in the conductive composite material is 60 to 72w %, and an amount of the carbon members in the conductive composite material is greater than or equal to 10w % and less than or equal to 17w % so as to form the electrical network, and a diameter of the metal powders in the conductive composite material is 10 nm to 100 nm, and an amount of the metal powders is greater than or equal to 12w % so as to increase an electrical network between the carbon members and to increase thermal conductivity of the conductive composite material, and is less than or equal to 22w % so as to reduce specific gravity of the conductive composite material, and specific gravity of the conductive composite material is 0.8 to 1.3, wherein the specific gravity is measured by a method according to ASTM D792, resistivity of the conductive composite material is 2 to 10 $\Omega mm^2/m$, and thermal conductivity of the conductive composite material is 156 to 235 kcal/mh° C.

2. The planar heating element of claim 1, wherein a tensile strength of the conductive composite material is 180 to 200 $kgf/cm^2$, wherein the tensile strength is measured by a method according to ASTM D638.

3. The planar heating element of claim 1, wherein the carbon members comprise carbon nanotubes and graphene, and a mixture ratio of the graphene and the carbon nanotubes is 1w %: 10w %.

4. The planar heating element of claim 1, wherein the carbon members comprise at least one of carbon fibers and carbon nanotubes, and a length of the carbon members is 1 to 100 μm.

5. The planar heating element of claim 1, wherein the metal powders comprise aluminum powder.

6. The planar heating element of claim 1, wherein the base resin comprises a non-conductive resin including acrylonitrile-butadiene-styrene (ABS), silicon, polyethylene (PE), polyethylene terephthalate (PET), polypropylene (PP), or polydimethylsiloxane (PDMS), and a conductive resin including polypyrrole (PPy), and an amount of the conductive resin in the base resin is greater than 0 and is less than or equal to 10w %.

7. The planar heating element of claim 1, wherein the conductive composite material further comprises a stabilizer and additives, and an amount of the stabilizer is 0.1 to 0.6w %, and an amount of the additives is 0.4 to 2.1w %.

8. The planar heating element of claim 1, wherein the wires comprise at least one of aluminum wires, copper alloy wires, copper wires, and conductive composite material wires.

9. The planar heating element of claim 1, further comprising a non-heating part that is distinguished from the heating part, is integrally formed and is formed of a material having lower electrical conductivity than the conductive composite material.

10. The planar heating element of claim 9, wherein the wires are insert injection molded into the matrix, and the heating part and the non-heating part are double injection molded.

11. A clothing management apparatus using a planar heating element, the clothing management apparatus comprising an ironing board for removing wrinkle or forming knife creases of pants by pressing a clothing, wherein the ironing board is a planar heating element planar including a heating part, which is configured such that a pair of wires are inserted into a matrix formed by forming a conductive composite material in which a base resin and a conductive material are mixed with each other, the pair of wires being spaced apart from each other by a predetermined distance, so that heat is generated by means of electrical resistance that is generated inside the matrix when power is applied, and the conductive material comprises:

carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and an amount of the base resin in the conductive composite material is 60 to 72w %, and an amount of the carbon members in the conductive composite material is greater than or equal to 10w % and less than or equal to 17w % so as to form the electrical network, and a diameter of the metal powders in the conductive composite material is 10 nm to 100 nm, and an amount of the metal powders is greater than or equal to 12w % so as to increase an electrical network between the carbon members and to increase thermal conductivity of the conductive composite material, and is less than or equal to 22w % so as to reduce specific gravity of the conductive composite material, and specific gravity of the conductive composite material is 0.8 to 1.3, wherein the specific gravity is measured by a method according to ASTM D792, resistivity of the conductive composite material is 2 to 10 $\Omega mm^2/m$, and thermal conductivity of the conductive composite material is 156 to 235 kcal/mh° C.

12. A hot/cold water purifier using a planar heating element, the hot/cold water purifier comprising a planar heating element provided to be in contact with at least one side of a hot water tank in which hot water is accommodated, wherein the planar heating element comprises a heating part, which is configured such that a pair of wires are inserted into a matrix formed by forming a conductive composite material in which a base resin and a conductive material are mixed with each other, the pair of wires being spaced apart from each other by a predetermined distance, so that heat is generated by means of electrical resistance that is generated inside the matrix when power is applied, and the conductive material comprises:

carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and an amount of the base resin in the conductive composite material is 60 to 72w %, and an amount of the carbon members in the conductive composite material is greater than or equal to 10w % and less than or equal to 17w % so as to form the electrical network, and a diameter of the metal powders in the conductive composite material is 10 nm to 100 nm, and an amount of the metal powders is greater than or equal to 12w % so as to increase an electrical network between the carbon members and to increase thermal conductivity of the conductive composite material, and is less than or equal to 22w % so as to reduce specific gravity of the conductive composite material, and specific gravity of the conductive composite material is 0.8 to 1.3, wherein the specific gravity is measured by a method according to ASTM D792, resistivity of the conductive composite material is 2 to 10 $\Omega mm^2/m$, and thermal conductivity of the conductive composite material is 156 to 235 kcal/mh° C.

13. A floor heating panel for a building using a planar heating element, the floor heating panel comprising a planar heating element provided on the floor heating panel for the building, wherein the planar heating element comprises a heating part, which is configured such that a pair of wires are inserted into a matrix formed by forming a conductive composite material in which a base resin and a conductive material are mixed with each other, the pair of wires being spaced apart from each other by a predetermined distance, so that heat is generated by means of electrical resistance that is generated inside the matrix when power is applied, and the conductive material comprises:

carbon members dispersed into the base resin and forming an electrical network; and metal powders interposed between the carbon members, increasing the electrical network by the carbon members and increasing thermal conductivity of the conductive composite material to transfer electrical resistance heat generated by the carbon members to a surface of the heating part, and an amount of the base resin in the conductive composite material is 60 to 72w %, and an amount of the carbon members in the conductive composite material is greater than or equal to 10w % and less than or equal to 17w % so as to form the electrical network, and a diameter of the metal powders in the conductive composite material is 10 nm to 100 nm, and an amount of the metal powders is greater than or equal to 12w % so as to increase an electrical network between the carbon members and to increase thermal conductivity of the conductive composite material, and is less than or equal to 22w % so as to reduce specific gravity of the conductive composite material, and specific gravity of the conductive composite material is 0.8 to 1.3, wherein the specific gravity is measured by a method according to ASTM D792, resistivity of the conductive composite material is 2 to 10 $\Omega mm^2/m$, and thermal conductivity of the conductive composite material is 156 to 235 kcal/mh° C.

* * * * *